(12) United States Patent
Rajaram et al.

(10) Patent No.: US 9,984,376 B2
(45) Date of Patent: May 29, 2018

(54) METHOD AND SYSTEM FOR AUTOMATICALLY IDENTIFYING ISSUES IN ONE OR MORE TICKETS OF AN ORGANIZATION

(71) Applicant: Wipro Limited, Bangalore (IN)

(72) Inventors: Venkatakrishnan Rajaram, Bengaluru (IN); Narayanan Ramani Konnayar, Bengaluru (IN); Ria Chakraborty, Kolkata (IN); Malathi Bellam Soundararajan, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 175 days.

(21) Appl. No.: 15/087,555

(22) Filed: Mar. 31, 2016

(65) Prior Publication Data
US 2017/0262858 A1 Sep. 14, 2017

(30) Foreign Application Priority Data
Mar. 11, 2016 (IN) .............................. 201641008636

(51) Int. Cl.
*G06F 17/27* (2006.01)
*G06F 17/21* (2006.01)
*G06Q 30/00* (2012.01)

(52) U.S. Cl.
CPC ......... *G06Q 30/016* (2013.01); *G06F 17/271* (2013.01); *G06F 17/2725* (2013.01); *G06F 17/2775* (2013.01)

(58) Field of Classification Search
CPC .. G06F 17/2785; G06F 17/271; G06F 17/275; G06F 17/277
See application file for complete search history.

(56) References Cited

U.S. PATENT DOCUMENTS

| | | | |
|---|---|---|---|
| 8,077,984 B2 * | 12/2011 | Cancedda | G06K 9/627 382/290 |
| 8,543,563 B1 * | 9/2013 | Nikoulina | G06F 17/2809 704/2 |
| 8,706,726 B2 | 4/2014 | Kassam et al. | |
| 8,898,092 B2 | 11/2014 | Bhamidipaty et al. | |
| 2004/0236566 A1 * | 11/2004 | Simske | G06F 17/274 704/4 |

(Continued)

*Primary Examiner* — Jialong He
(74) *Attorney, Agent, or Firm* — Finnegan, Henderson, Farabow, Garrett & Dunner LLP

(57) ABSTRACT

The present disclosure relates to method and system for automatically identifying one or more issues in one or more tickets of an organization. An issue identification system retrieves a sequence pattern from ticket data received from one or more data sources. The issue identification system generates one or more first sub-sequence patterns of the n-grams from the sequence pattern. Further, frequency of occurrence and Part-of-Speech (POS) weightage of each of the one or more first sub-sequence patterns of the n-grams are determined by the issue identification system. A first score is determined for each of the one or more first sub-sequence patterns of the n-grams based on both the frequency and the POS weightage. Upon determining the first score, the issue identification system identifies one or more issues in the one or more tickets automatically based on the first sub-sequence pattern of the n-grams associated with a highest first score.

17 Claims, 5 Drawing Sheets

(56) References Cited

U.S. PATENT DOCUMENTS

| | | | |
|---|---|---|---|
| 2008/0249762 A1* | 10/2008 | Wang | G06F 17/2785 704/9 |
| 2009/0125371 A1* | 5/2009 | Neylon | G06F 17/30616 707/739 |
| 2010/0161539 A1 | 6/2010 | Kandanala et al. | |
| 2012/0078613 A1* | 3/2012 | Kandekar | G06F 17/2745 704/9 |
| 2013/0253910 A1* | 9/2013 | Turner | G06F 17/274 704/9 |
| 2014/0006861 A1 | 1/2014 | Jain et al. | |
| 2014/0136541 A1* | 5/2014 | Farahat | G06F 17/3089 707/740 |
| 2015/0025886 A1* | 1/2015 | Bangalore | G06F 17/271 704/244 |
| 2016/0012038 A1* | 1/2016 | Edwards | G06F 17/2785 704/9 |
| 2016/0232156 A1* | 8/2016 | Orsini | G06F 17/2854 |
| 2016/0357728 A1* | 12/2016 | Bellegarda | G06F 17/275 |
| 2017/0060996 A1* | 3/2017 | Das | G06F 17/277 |

* cited by examiner

METHOD AND SYSTEM FOR AUTOMATICALLY IDENTIFYING ISSUES IN ONE OR MORE TICKETS OF AN ORGANIZATION

TECHNICAL FIELD

The present subject matter is related in general to pattern analysis, and more particularly, but not exclusively to method and system for automatically identifying issues in one or more tickets of an organization based on pattern analysis.

BACKGROUND

Generally, in an Information Technology (IT) Support environment, large volumes of data is generated from various tools like Ticketing tools, Monitoring tools and Quality systems. To identify one or more issues and to identify opportunities for ensuring service improvements for the one or more issues, recurring patterns of data should be analysed. This is a hectic process as the volume of data is large. Some of the fields could be dimension fields having a fixed list of value, while other fields may be unstructured i.e. free text fields entered by users. Analysing the data using existing dimensions such as ticket category, ticket type etc. only provides the explicitly classified data. The result of the analysis of the data using existing dimensions provides only brief details of the issue. Obtaining data related to the issues at another level of detail to identify specific improvement areas through automation, elimination or other means becomes crucial.

Currently, manual analysis is performed using the data of various dimensions in combination with the unstructured text provided by the user. The key patterns are retrieved manually to identify data related to the issues at another level of detail that is not explicitly available. But due to the huge volumes of data and variety of systems involved, it is a very tedious and time consuming process to identify the issues manually. Also, a lot of resources are involved in the manual process. In one of the existing techniques, the tickets are analysed by collecting data associated with one or more parameters/keywords of tickets and determining if a number of tickets associated with the one or more parameters/keywords exceeds a count threshold associated with the one or more parameters. Further in another existing technique, the tickets are analysed which are associated to at least one issue associated with at least one of a product and service. Analysing the received data may include calibrating the one or more modules based on the received data and processing the data based on the calibration. Most of the existing systems are supervised techniques where the system may not learn on its own. Also, the existing systems do not provide data related to the issues at another level of detail which becomes the input in ensuring service improvements and cost optimization. The existing systems are not robust and generic that can be applied to any kind of tickets and do not have the ability to integrate with an array of different platforms with little or no customizations.

Therefore, there is need for a solution which automatically identifies the issues in the tickets using the unstructured data provided by the user. Also, there is need for a solution which is robust and generic.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein are a method and a system for automatically identifying one or more issues in one or more tickets of an organization. An issue identification system identifies one or more first sub-sequence patterns of n-grams from description of the one or more issues provided by a user in the ticket data. The one or more issues in the ticket are identified from the one or more first sub-sequence patterns based on the frequency of occurrence and POS weightage assigned to the one or more first sub-sequence patterns. The issues identified provide information of the one or more issues at a detailed level that ensures service improvement of the tickets.

Accordingly, the present disclosure comprises a method for automatically identifying one or more issues in one or more tickets of an organization. The method comprises receiving, by an issue identification system, ticket data of one or more tickets related to a service category from one or more data sources. Further, the issue identification system generates one or more first sub-sequence patterns of n-grams for the one or more tickets from a sequence pattern retrieved from the ticket data. Upon generating the one or more first sub-sequence patterns, the issue identification system determines a frequency of occurrence of each of the one or more first sub-sequence patterns of the n-grams and a Part-of-Speech (POS) weightage of the one or more first sub-sequence patterns of the n-grams. Further, the issue identification system determines a first score for each of the one or more first sub-sequence patterns of the n-grams based on the frequency of occurrence and the POS weightage. Finally, the issue identification system automatically identifies one or more issues in the one or more tickets based on the first sub-sequence pattern of the n-grams associated with a highest first score.

Further, the present disclosure comprises an issue identification system for automatically identifying one or more issues in one or more tickets of an organization. The issue identification system comprises a processor and a memory communicatively coupled to the processor. The memory stores the processor-executable instructions, which, on execution, causes the processor to receive ticket data of one or more tickets related to a service category from one or more data sources. Upon receiving the ticket data, the processor generates one or more first sub-sequence patterns of the n-grams for the one or more tickets from a sequence pattern retrieved from the ticket data. Further, the processor determines a frequency of occurrence of each of the one or more first sub-sequence patterns of the n-grams and a Part-of-Speech (POS) weightage of the one or more first sub-sequence patterns of the n-grams. Upon determining the frequency of occurrence and the POS weightage, the processor determines a first score for each of the one or more first sub-sequence patterns of the n-grams based on the frequency of occurrence and the POS weightage. Finally, the processor identifies automatically, one or more issues in the one or more tickets based on the first sub-sequence pattern of the n-grams associated with a highest first score.

Further, the present disclosure comprises a non-transitory computer readable medium including instructions stored thereon that when processed by at least one processor causes an issue identification system to perform operations comprising receiving ticket data of one or more tickets related to a service category from one or more data sources. The instructions further cause the processor to generate one or more first sub-sequence patterns of n-grams for the one or more tickets from a sequence pattern retrieved from the ticket data. Further, the instructions cause the processor to determine a frequency of occurrence of each of the one or more first sub-sequence patterns of the n-grams and a Part-of-Speech (POS) weightage of the one or more first sub-sequence patterns of the n-grams. Upon determining the frequency and the POS weightage, the instructions cause the processor to determine a first score for each of the one or more first sub-sequence patterns of the n-grams based on the frequency of occurrence and the POS weightage. Finally, the instructions cause the processor to identify automatically, one or more issues in the one or more tickets based on the first sub-sequence pattern of the n-grams associated with a highest first score.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
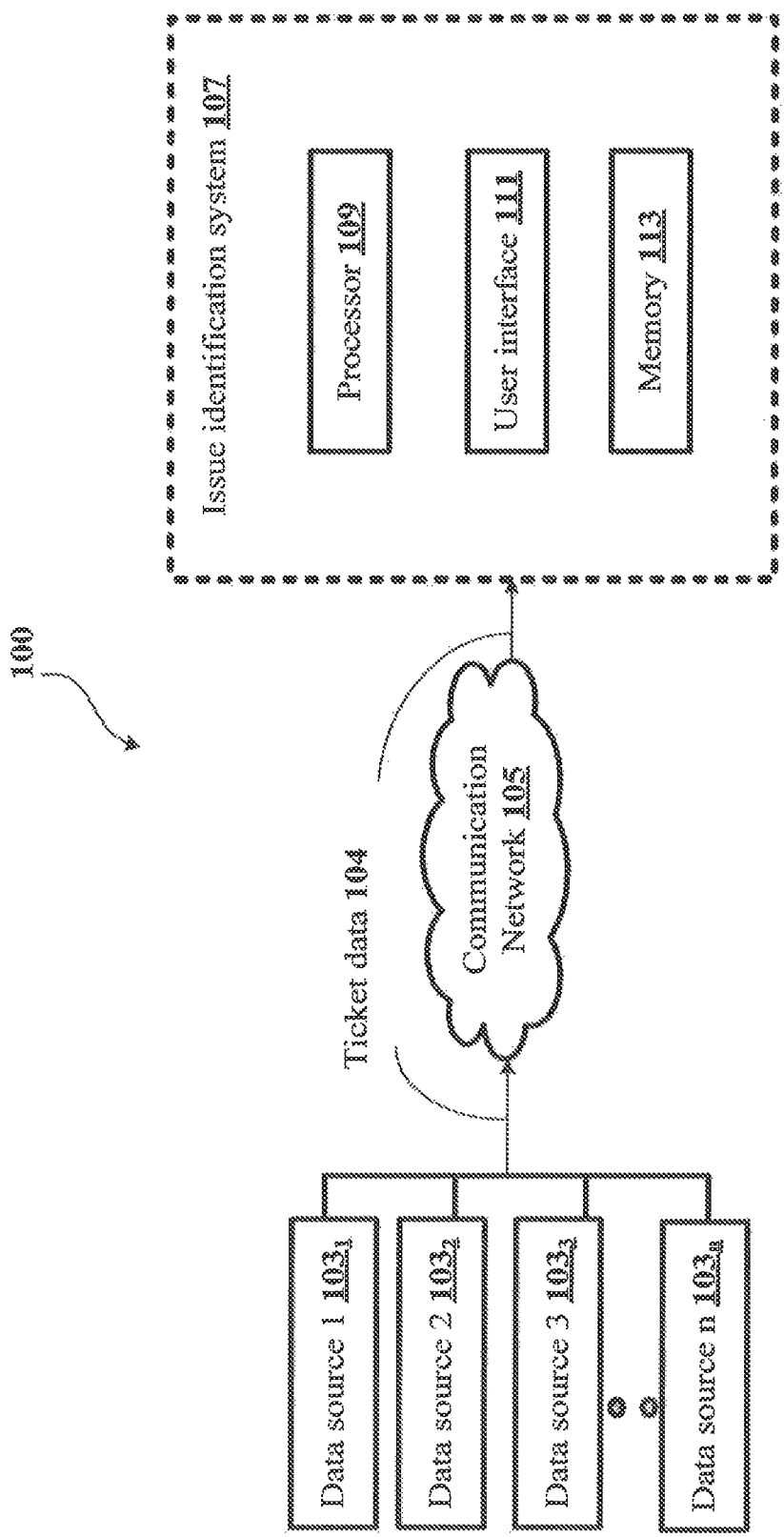
FIG. 1 shows an exemplary architecture for automatically identifying one or more issues in one or more tickets of an organization in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a system for automatically identifying one or more issues in one or more tickets of an organization. An issue identification system receives ticket data of one or more tickets related to a service category from one or more data sources. The issue identification system retrieves a sequence pattern for each of the one or more tickets by deleting one or more stop words and symbols from the ticket data. Upon retrieving the sequence pattern, the issue identification system generates one or more first sub-sequence patterns of n-grams for the one or more tickets from the sequence pattern. In an embodiment, the n-grams indicate number of words present in each of the one or more first sub-sequence patterns, wherein n is a variable greater than or equal to 2. Further, a frequency of occurrence of each of the one or more first sub-sequence patterns of the n-grams is determined by the issue identification system. Upon determining the frequency of occurrence, a Part-of-Speech (POS) weightage of the one or more first sub-sequence patterns of the n-grams is determined by the issue identification system. A first score is determined by the issue identification system for each of the one or more first sub-sequence patterns of the n-grams based on both the frequency and the POS weightage. Upon determining the first score, the issue identification system identifies one or more issues in the one or more tickets automatically based on the first sub-sequence pattern of the n-grams associated with a highest first score. Further, an issue report is generated based on the identified one or more issues with the highest first score.

If there are one or more first sub-sequence patterns having highest first score below a predefined value, the issue identification system identifies the sequence pattern corresponding to the one or more first subsequence patterns having highest first score below the predefined value. Upon identifying the corresponding sequence patterns, one or more second sub-sequence patterns are generated by removing one or more words from the sequence patterns. The one or more words are removed in the order of their occurrence and the number of words removed from each sequence patterns to generate one or more second sub-sequence patterns indicate the distance value of the corresponding second sub-sequence pattern. The frequency of occurrence of each of the one or more second sub-sequence patterns of the n-grams and a POS weightage of the one or more second sub-sequence patterns of the n-grams is determined. In an embodiment, the POS weightage of the one or more second sub-sequence pattern depends upon the distance value associated with each of the one more second sub-sequence patterns. A second score is determined for each of the one or more second sub-sequence patterns of the n-grams based on the frequency of occurrence and the POS weightage. The issue identification system automatically updates the one or more issues in the one or more tickets by merging the second sub-sequence pattern with a highest second score with the first sub-sequence pattern with the highest first score. If one or more predefined domain keywords are present in the one or more first sub-sequence patterns or the one or more second sub-sequence patterns, then those one or more first sub-sequence patterns or the one or more second sub-sequence patterns are considered as a representative first sub-sequence pattern or a representative second sub-sequence pattern for their corresponding tickets.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for automatically identifying one or more issues in one or more tickets of an organization in accordance with some embodiments of the present disclosure.

The architecture 100 comprises one or more data sources, data source 1 $103_1$ to data source n $103_n$, (collectively referred to as one or more data sources 103), a communication network 105 and an issue identification system 107. As an example, the one or more data sources 103 may be one or more ticketing systems of an organization. The one or more ticketing systems refer to one or more tools that are used to manage lifecycle of a support ticket. The one or more ticketing systems may be a commercial product or a custom developed solution for the organization. As an example, the organization may be any entity like a software company, a bank, an insurance company etc. that provides support to one or more users using the one or more ticketing systems. The one or more ticketing systems allow the one or more users to log one or more tickets, track the one or more tickets and maintain all the attributes related to the one or more tickets. The communication network 105 may be at least one of wired communication network and wireless communication network.

The one or more data sources 103 may provide ticket data 104 of the one or more tickets of the organization to the issue identification system 107 through the communication network 105. As an example, the ticket data 104 may include, but not limited to, historical ticket data and various attributes of the one or more tickets. As an example, the attributes of the one or more tickets may be a ticket Identification (ID), description of one or more issues, service category of the one or more tickets like desktop support, mainframe support etc. and other data related to the one or more tickets such as ticket category, ticket type etc. In an embodiment, the description of the one or more issues may be in a plain text format for example in plain English. The issue identification system 107 comprises a processor 109, a user interface 111 and a memory 113. The processor 109 retrieves the description of the one or more issues of each of the one or more tickets from the ticket data stored in the memory 113. The description of the one or more issues of each of the one or more tickets retrieved, have the same service category. The retrieved ticket data is as shown in the below exemplary Table 1.

TABLE 1

| Ticket ID | Description of issues | Service Category |
|---|---|---|
| 456780 | Down unable to connect to outlook server | Desktop Support |
| 456781 | User is unable to connect to network | Desktop Support |
| 456782 | Error user uanble to connect to proxy server | Desktop Support |
| 456783 | User unable to email, connect to outlook | Desktop Support |

Consider first row in the above Table 1, wherein the ticket ID of the ticket may be 456780, description of the issue may be "Down unable to connect to outlook server" and the service category of the ticket may be "Desktop support".

Upon retrieving the description of the one or more issues from the ticket data, the processor 109 removes one or more stop words and one or more symbols present in the description of each of the one or more issues. Stop words are the words which are filtered out before or after processing of natural language data. As an example, the one or more stop words may be "a", "an", "the", "to", "is", "but", "how", "or" etc. By removing the one or more stop words and the one or more symbols, a sequence pattern is formed for each of the one or more tickets. The one or more sequence patterns are shown in the below Table 2.

TABLE 2

| Ticket ID | Description of issues | Service Category |
|---|---|---|
| 456780 | Down unable connect outlook server | Desktop Support |
| 456781 | User unable connect network | Desktop Support |
| 456782 | Error user uanble connect proxy server | Desktop Support |
| 456783 | User unable email connect outlook | Desktop Support |

Further the processor 109 generates the one or more first sub-sequence patterns of the n-grams from each of the one or more sequence patterns. In an embodiment, the n-grams indicate the number of words present in each of the one or more sub-sequence patterns, wherein n is a variable greater than or equal to 2. As an example, if the number of words of the one or more first sub-sequence patterns is 2, then the one or more first sub-sequence patterns are referred to as 2-gram first sub-sequence patterns. In an embodiment, the one or more first sub-sequence patterns are generated by retaining the order of words in the sequence pattern for each of the one or more tickets. As an example, if the sequence pattern is "User unable connect network", the 2-gram first sub-sequence patterns of the sequence may be "User unable", "unable connect" and "connect network". In an embodiment, sub-sequence patterns like "User connect", "user network", "unable network", "network connect" etc. are invalid first sub-sequence patterns as they are formed by either skipping one or more words in the sequence pattern or they do not maintain the order of words in the sequence pattern. By retaining the order of words the context of the issue as reported by the one or more users is maintained. Similarly, the one or more first sub-sequence patterns of 3-grams, 4-grams up to the n-grams are generated for the sequence pattern of each of the one or more tickets. In an embodiment, each sequence pattern may have one or more first sub-sequence patterns of the n-grams as shown in the below Table 3, Table 4 and Table 5.

TABLE 3

| Service category | Ticket ID | Sequence pattern | First subsequence pattern (2-gram) |
|---|---|---|---|
| Desktop support | 456780 | Down unable connect outlook server | Down unable<br>Unable connect<br>Connect outlook<br>Outlook server |
| Desktop support | 456781 | User unable connect network | User unable<br>Unable connect<br>Connect network |
| Desktop support | 456782 | Error user uanble connect proxy server | Error user<br>User uanble<br>Uanble connect<br>Connect proxy<br>Proxy server |
| Desktop support | 456783 | User unable email connect outlook | User unable<br>Unable email<br>Email connect<br>Connect outlook |

TABLE 4

| Service category | Ticket ID | Sequence pattern | First subsequence pattern (3-gram) |
|---|---|---|---|
| Desktop support | 456780 | Down unable connect outlook server | Down unable connect<br>Unable connect outlook<br>Connect outlook server |
| Desktop support | 456781 | User unable connect network | User unable connect<br>Unable connect network |
| Desktop support | 456782 | Error user uanble connect proxy server | Error user uanble<br>User uanble connect<br>Uanble connect proxy<br>Connect proxy server |
| Desktop support | 456783 | User unable email connect outlook | User unable email<br>Unable email connect<br>Email connect outlook |

TABLE 5

| Service category | Ticket ID | Sequence pattern | First subsequence pattern (4-gram) |
|---|---|---|---|
| Desktop support | 456780 | Down unable connect outlook server | Down unable connect outlook<br>Unable connect outlook server |
| Desktop support | 456781 | User unable connect network | User unable connect network |
| Desktop support | 456782 | Error user uanble connect proxy server | Error user uanble connect<br>User uanble connect proxy<br>Uanble connect proxy server |
| Desktop support | 456783 | User unable email connect outlook | User unable email connect<br>Unable email connect outlook |

Similarly the one or more first sub-sequence patterns can be generated till the n-grams.

Upon generating the one or more first sub-sequence patterns of the n-grams for each sequence pattern of each of the one or more tickets, the processor 109 determines frequency of occurrence of each of the one or more first sub-sequence patterns of the n-grams of each of the one or more tickets belonging to the same service category. Each of the one or more first sub-sequence patterns of the n-grams of each of the one or more tickets are compared with each of the rest of the one or more first sub-sequence patterns of corresponding the n-grams of rest of the one or more tickets belonging to the same service category. The number of times each of the one or more first sub-sequence patterns repeat upon the comparison is the frequency of occurrence of the each of the one or more first sub-sequence patterns of the n-grams. The frequency of occurrence of each of the one or more first sub-sequence pattern is stored in the memory 113.

As an example, consider the ticket ID "456780" from Table 3. The first sub-sequence pattern "unable connect" of 2-grams is compared with the rest of the one or more first sub-sequence patterns of 2-grams of the rest of the one or more tickets having the ticket IDs "456781", "456782" and "456783" as shown in Table 3. "Unable connect" appears 2 times upon comparison with the rest of the one or more first subsequence patterns. Therefore, the frequency of occurrence of the first sub-sequence pattern "unable connect" is 2.

Upon determining the frequency of occurrence of each of the one or more first sub-sequence patterns of the n-grams of each of the one or more tickets, the processor 109 determines a Part-Of-Speech (POS) weightage for each of the one or more first sub-sequence patterns of the n-grams. Each of the one or more words in each of the one or more first sub-sequence patterns of n-grams are assigned with a POS tag indicating the POS. As an example, the one or more Parts-Of-Speech may be a Noun, a verb, a pronoun, an adjective etc. In an embodiment, "CAPS" is included to the one or more Parts-Of-Speech which may be assigned to the one or more words of the one or more first sub-sequence patterns if the one or more words of the one or more first sub-sequence patterns are in uppercase. Each of the one or more first sub-sequence patterns is associated with a combination of the POS tags. As an example, the one or more combinations of the POS tags for the one or more first sub-sequence patterns of 2-grams may include, but not limited to, a Noun/Noun (NN/NN), Noun/CAPS (NN/CAPS) or CAPS/Noun (CAPS/NN), Noun/Verb (NN/VB) or Verb/Noun (VB/NN), Noun/Adjective (NN/JJ) or Adjective/Noun (JJ/NN) and other POS tag combinations. Similarly, the one or more combinations of the POS tags for the one or more first sub-sequence patterns of 3-grams may include, but not limited to, NN/NN/NN, NN/NN/CAPS (in any order), NN/NN/VB (in any order), NN/NN/JJ (in any order) and other POS tag combinations. Similarly, the one or more combinations of the POS tags for the one or more first sub-sequence patterns of 4-grams may include, but not limited to, NN/NN/NN/NN, NN/NN/NN/CAPS (in any order), NN/NN/NN/VB (in any order), NN/NN/VB/VB (in any order), NN/NN/NN/JJ (in any order), NN/NN/VB/JJ (in any order) and other POS tags. Similarly the one or more combinations of the POS tags are assigned to each of the one or more first sub-sequences up to the n-grams. Each of the one or more combinations of the POS tags is associated with a predefined POS weightage. The POS weightage is assigned based on a predefined priority associated with each of the one or more combinations of the POS tags. The predefined POS weightage may be dynamically configured. The predefined POS weightage for the one or more combinations of the POS tags up to 4-grams are shown in the below Table 6.

TABLE 6

| n-gram | POS-tag combination | Predefined weightage |
| --- | --- | --- |
| 2-Grams | NN/NN | 2 |
| 2-Grams | NN/CAPS or (CAPS/NN) | 2 |
| 2-Grams | NN/VB or (VB/NN) | 1.5 |
| 2-Grams | NN/JJ or (JJ/NN) | 1.5 |
| 2-Grams | Other POS tag combinations | 1 |
| 3-Grams | NN/NN/NN | 2 |
| 3-Grams | NN/NN/CAPS (in any order) | 2 |
| 3-Grams | NN/NN/VB (in any order) | 1.5 |
| 3-Grams | NN/NN/JJ (in any order) | 1.5 |
| 3-Grams | Other POS tag combinations | 1 |
| 4-Grams | NN/NN/NN/NN | 2 |
| 4-Grams | NN/NN/NN/CAPS (in any order) | 2 |
| 4-Grams | NN/NN/NN/VB (in any order) or NN/NN/VB/VB (in any order) | 1.5 |
| 4-Grams | NN/NN/NN/JJ (in any order) or NN/NN/VB/JJ (in any order) | 1.5 |
| 4-Grams | Other POS tag combinations | 1 |

As shown in the above Table 6, the combination of the POS tags NN/NN is associated with the predefined POS weightage of 2. The combination of the POS tags NN/CAPS is associated with the predefined POS weightage of 2. Similarly, the predefined POS weightage is assigned for each of the one or more combinations of the POS tags for the n-grams.

As an example, consider the 2-gram first sub-sequence pattern "Outlook server". Both "Outlook" and "server" are nouns. Therefore, the combination of the POS tags associated with the 2-gram first sub-sequence pattern "Outlook server" is NN/NN. As indicated in Table 6, the predefined POS weightage associated with the combination of the POS tags NN/NN is 2. Hence, the POS weightage of the first sub-sequence pattern "Outlook server" is 2.

Similarly, consider the 2-gram first sub-sequence pattern "Connect outlook". The word "connect" is a verb and the word "outlook" is a noun. Therefore, the combination of the POS tags associated with the 2-gram first sub-sequence pattern "Connect outlook" is VB/NN. As indicated in Table 6, the predefined POS weightage associated with the combination of the POS tags VB/NN is 1.5. Hence, the POS weightage of the first sub-sequence "Connect outlook" is 1.5.

Upon determining the POS weightage of the one or more first sub-sequence patterns of the n-grams, a first score is determined for each of the one or more first sub-sequence patterns of the n-grams based on the frequency of occurrence and the POS weightage determined for each of the one or more first sub-sequence patterns. In an embodiment, the first score is calculated for each of the one or more first sub-sequence patterns using the below mentioned equation (Equation 1).

First score=Frequency of occurrence*POS weightage (Equation 1)

As an example, consider the frequency of occurrence of the 2-gram first sub-sequence pattern "connect outlook" is 10. Consider the POS weightage of the 2-gram first sub-sequence pattern "connect outlook" is 1.5. Therefore, the first score of the 2-gram first sub-sequence pattern "connect outlook" is 15. Similarly, determine the first score for each of the one or more first sub-sequence patterns of the n-grams. The first sub-sequence pattern with the highest first score in each of the one or more tickets of each n-gram is considered as a representative first sub-sequence pattern for the corresponding ticket. The one or more issues are automatically identified in each of the one or more tickets based on the first sub-sequence pattern with the highest first score. Upon automatically identifying the one or more issues in each of the one or more tickets, the processor 109 generates an issue report which is displayed on the user interface 111. An exemplary issue report is as shown in the below Table 7a.

TABLE 7a

| 2-Gram first sub-sequence pattern with the highest first score | 3-Gram first sub-sequence pattern with the highest first score | 4-Gram first sub-sequence pattern with the highest first score | n-Gram first sub-sequence pattern with the highest first score |
| --- | --- | --- | --- |
| Unable Connect (3100 tickets) | Unable Connect Network (1200 tickets) Unable Connect outlook (1000 tickets) Unable connect Proxy (800 tickets) Unable connect WiFi (100 tickets) | | |
| Uanble connect (300 tickets) | Uanble connect proxy (300) | Uanble connect proxy server (300) | ... |
| Unable email (50 tickets) | Unable email connect (30) Unable email outlook (20) | | |

As an example, "unable connect" is the first sub-sequence pattern with the highest first score for 3100 tickets. Similarly, "unable connect" is the first sub-sequence pattern with the highest first score for 300 tickets. Similarly, "unable email" is the first sub-sequence pattern with the highest first score for 50 tickets.

In an embodiment, if there is any spelling mistake found in the one or more first sub-sequence patterns, the processor 109 considers them as separate first sub-sequence patterns. As an example, consider the 2-gram first sub-sequence pattern "unable connect" and another 2-gram first sub-sequence pattern "unable connect". Though the issue is the same, because of the spelling mistake, the processor 109 considers the two first sub-sequence patterns as different issues. Therefore, a predefined technique is used to overcome the problems related to spelling mistakes and typographical errors, so that the same issues are grouped together. As an example, the predefined technique may be a Levenshtein algorithm. Upon applying the predefined technique for the one or more first sub-sequences, the exemplary issue report shown in Table 7a may be updated as shown in the below Table 7b.

TABLE 7b

| 2-Gram first sub-sequence pattern with the highest first score | 3-Gram first sub-sequence pattern with the highest first score | 4-Gram first sub-sequence pattern with the highest first score | n-Gram first sub-sequence pattern with the highest first score |
|---|---|---|---|
| Unable Connect (3400 tickets) | Unable Connect Network (1200 tickets) | | |
| | Unable Connect outlook (1000 tickets) | | |
| | Unable connect Proxy (1100 tickets) | Unable connect proxy server (300) | |
| | Unable connect WiFi (100 tickets) | | |
| Unable email (50 tickets) | Unable email connect (30) | | |
| | Unable email outlook (20) | | |

Upon generating the issue report, the processor 109 identifies the one or more first sub-sequence patterns of the n-grams of the one or more tickets with a first score less than a predefined value. A predefined value indicates a score that helps in identifying the one or more first sub-sequence patterns with the first score less than the score specified by the predefined value. If the first score is less than a predefined value, then the issue identified for that ticket may not be the correct issue which the user intended to convey. Therefore, the one or more first sub-sequence patterns of the n-grams of the one or more tickets with a first score less than a predefined value are identified so that the identified one or more first sub-sequence patterns may be further analyzed by the processor 109 to correctly determine the one or more issues of those one or more tickets. The processor 109 identifies the sequence pattern associated with each of the one or more identified first sub-sequence patterns to perform the further analysis of the identified one or more first sub-sequence patterns. Upon determining the one or more correct issues of the identified one or more first sub-sequence patterns, the one or more correct issues are merged with the corresponding one or more first sub-sequence patterns of the highest score to generate an updated issue report.

As an example, consider the predefined value is 100. If the first sub-sequence pattern of 2-gram "unable email" has the first score 20, there is a high probability that issue identified as "unable email" may not be correct. Therefore, the first sub-sequence pattern of 2-gram "unable email" may be further analyzed to identify if the issue associated with the ticket of the first sub-sequence pattern of 2-gram "unable email" belongs to one of the 2-gram first sub-sequence pattern with the highest first score. The one or more second sub-sequence patterns of the n-grams are generated from each of the sequence patterns corresponding to the one or more identified first sub-sequence patterns. In an embodiment, the one or more second sub-sequence patterns for each of the sequence patterns are generated by removing one or more words from the sequence pattern in the order of their occurrence. The one or more words removed from each of the sequence pattern to form each of the one or more second sub-sequence patterns of the n-grams is the distance value associated with each of the one or more second sub-sequence patterns.

As an example, consider the sequence pattern "user unable email connect outlook" identified from the first sub-sequence pattern of 2-grams "unable email" with the first score less than the predefined value. The one or more second sub-sequence patterns are generated by removing one or more words from the sequence pattern in the order of their occurrence. Therefore, the below Table 8 shows the one or more second sub-sequences generated for the sequence pattern along with the distance value associated with each of the one or more second sub-sequences.

TABLE 8

| Ticket ID | 2-gram second sub-subsequence patterns | Distance value |
|---|---|---|
| 456783 | User email | 1 |
| 456783 | User connect | 2 |
| 456783 | User outlook | 3 |
| 456783 | Unable connect | 1 |
| 456783 | Unable outlook | 2 |
| 456783 | Email outlook | 1 |

In the above Table 8,

One word "unable" is removed in the sequence pattern "user unable email connect outlook" to generate the second sub-sequence pattern "user email". Therefore, the distance value associated with the second sub-sequence pattern "user email" is 1.

Two words "unable and "email" are removed in the sequence pattern "user unable email connect outlook" to generate the second sub-sequence pattern "user connect". Therefore, the distance value associated with the second sub-sequence pattern "user connect" is 2.

Similarly, the distance value is determined for each of the one or more second sub-sequence patterns of the n-grams generated from the sequence pattern of the one or more tickets.

Upon generating the one or more second sub-sequence patterns, the generated one or more second sub-sequence patterns are further analyzed by determining frequency of occurrence and POS weightage of each of the one or more second sub-sequence patterns of the n-grams.

The processor 109 determines the frequency of occurrence of each of the one or more second sub-sequence patterns of the n-grams of the one or more tickets belonging to the same service category. Each of the one or more second sub-sequence patterns of the n-grams of the ticket are compared with each of the rest of the one or more second sub-sequence patterns of corresponding the n-grams of rest of the one or more tickets belonging to the same service category. The number of times each of the one or more second sub-sequence patterns repeat upon the comparison is the frequency of occurrence of the each of the one or more second sub-sequence patterns of the n-grams. The frequency of occurrence of each of the one or more second sub-sequence pattern is stored in the memory 113.

Upon determining the frequency of occurrence of each of the one or more second sub-sequence patterns of the n-grams of the one or more tickets, the processor 109 determines a POS weightage for each of the one or more second sub-sequence patterns of the n-grams. Each of the one or more words in each of the one or more second sub-sequence patterns of n-grams are assigned with a POS tag indicating the POS. As an example, the one or more Parts-Of-Speech may be a Noun, a verb, a pronoun, an adjective etc. In an embodiment, "CAPS" is included to the one or more Parts-Of-Speech which may be assigned to the one or more words of the one or more second sub-sequence patterns if the one or more words of the one or more second sub-sequence patterns are in uppercase. Each of the one or more second sub-sequence patterns is associated with a combination of the POS tags. As an example, the one or more combinations of the POS tags for the one or more second sub-sequence patterns of 2-grams may include, but not limited to, a Noun/Noun (NN/NN), Noun/CAPS (NN/CAPS) or CAPS/Noun (CAPS/NN), Noun/Verb (NN/VB) or Verb/Noun (VB/NN), Noun/Adjective (NN/JJ) or Adjective/Noun (JJ/NN) and other POS tag combinations. Similarly, the one or more combinations of the POS tags for the one or more second sub-sequence patterns of 3-grams may include, but not limited to, NN/NN/NN, NN/NN/CAPS (in any order), NN/NN/VB (in any order), NN/NN/JJ (in any order) and other POS tag combinations. Similarly, the one or more combinations of the POS tags for the one or more second sub-sequence patterns of 4-grams may include, but not limited to, NN/NN/NN/NN, NN/NN/NN/CAPS (in any order), NN/NN/NN/VB (in any order), NN/NN/VB/VB (in any order), NN/NN/NN/JJ (in any order), NN/NN/VB/JJ (in any order) and other POS tag combinations. Similarly the one or more combinations of the POS tags are assigned up to the n-grams. Each of the one or more combination of the POS tags is associated with a predefined POS weightage. The POS weightage is assigned based on a predefined priority associated with each of the one or more combinations of the POS tags. The predefined POS weightage may be dynamically configured. In an embodiment, the predefined POS weightage is based on the distance value associated with each of the one or more second sub-sequence patterns of the n-grams. The predefined POS weightage is inversely proportional to the distance value i.e. greater the distance value, lesser is the predefined POS weightage associated with each of the one or more second sub-sequence patterns of the n-grams. The predefined POS weightage for the one or more combinations of the POS tags up to 4-grams are shown in the below Table 9.

TABLE 9

| n-gram | POS-tag combination | Predefined weightage (based on distance value) |
|---|---|---|
| 2-Grams | NN/NN | 0.99 |
| 2-Grams | NN/CAPS or (CAPS/NN) | 0.99 |
| 2-Grams | NN/VB or (VB/NN) | 0.75 |
| 2-Grams | NN/JJ or (JJ/NN) | 0.75 |
| 2-Grams | Other POS tag combinations | 0.50 |
| 3-Grams | NN/NN/NN | 0.99 |
| 3-Grams | NN/NN/CAPS (in any order) | 0.99 |
| 3-Grams | NN/NN/VB (in any order) | 0.75 |
| 3-Grams | NN/NN/JJ (in any order) | 0.75 |
| 3-Grams | Other POS tag combinations | 0.50 |
| 4-Grams | NN/NN/NN/NN | 0.99 |
| 4-Grams | NN/NN/NN/CAPS (in any order) | 0.99 |
| 4-Grams | NN/NN/NN/VB (in any order) or NN/NN/VB/VB (in any order) | 0.75 |
| 4-Grams | NN/NN/NN/JJ (in any order) or NN/NN/VB/JJ (in any order) | 0.75 |
| 4-Grams | Other POS tag combinations | 0.50 |

The predefined POS weightage associated with the one or more second sub-sequence patterns is less than the predefined POS weightage associated with the one or more first sub-sequence patterns due to the distance value.

As shown in the above Table 9, the combination of the POS tags NN/NN is associated with the predefined POS weightage of 0.99. The combination of the POS tags NN/CAPS is associated with the predefined POS weightage of 0.99. Similarly, the predefined POS weightage is assigned for each of the one or more combinations of the POS tags for the n-grams.

As an example, consider the 2-gram second sub-sequence pattern "Unable email". "Unable" is an adjective and "email" is a noun. Therefore, the combination of the POS tags associated with the 2-gram second sub-sequence pattern "unable email" is JJ/NN. As indicated in Table 9, the predefined POS weightage associated with the combination of the POS tags JJ/NN is 0.75. Hence, the POS weightage of the second sub-sequence pattern "unable email" is 0.75.

Upon determining the POS weightage of the one or more second sub-sequence patterns of the n-grams, a second score is determined for each of the one or more second sub-sequence patterns of the n-grams. The second score is determined based on the frequency of occurrence and the POS weightage determined for each of the one or more second sub-sequence patterns. In an embodiment, the second score is calculated for each of the one or more second sub-sequence patterns using the below mentioned equation (Equation 2).

$$\text{Second score} = \text{Frequency of occurrence} * \text{POS weightage} \quad \text{(Equation 2)}$$

As an example, consider the frequency of occurrence of the 2-gram second sub-sequence pattern "unable email" is 10. Consider the POS weightage of the 2-gram second sub-sequence pattern "unable email" is 0.75. Therefore, the second score of the 2-gram second sub-sequence pattern "unable email" is 7.5. Similarly, the processor 109 determines the second score for each of the one or more second sub-sequence patterns of the n-grams. The second sub-sequence pattern with the highest second score in each n-gram is considered as a representative second sub-sequence pattern. The one or more issues are automatically identified in the one or more tickets based on the second sub-sequence pattern with the highest second score. The processor 109 merges the one or more second sub-sequence patterns of the n-grams with the highest second score with the one or more first sub-sequence patterns of the corresponding n-grams with the highest first score. Finally, the processor 109 generates an updated issue report and displays the issue report on the user interface 111.

As an example, consider the sequence pattern "user unable email connect outlook". Before generating the one or more second sub-sequence patterns for the sequence pattern, "unable email" was the first sub-sequence pattern with the highest first score. Upon generating the one or more second sub-sequence patterns for the sequence pattern "user unable email connect outlook" and performing further analysis, the second sub-sequence pattern with the highest second score determined is "unable connect". "Unable connect" is one of the first sub-sequence pattern of 2-gram with the highest first score as shown in Table 7a and Table 7b. Therefore, the processor 109 determined that the correct issue related with the sequence pattern "user unable email connect outlook" is related to "unable connect" upon the further analysis. The issue report shown in the Table 7b is updated upon identifying the correct issue and an exemplary updated report is displayed on the user interface 113 as shown in the below Table 10.

TABLE 10

| 2-Gram first sub-sequence pattern with the highest first score | 3-Gram first sub-sequence pattern with the highest first score | 4-Gram first sub-sequence pattern with the highest first score | n-Gram first sub-sequence pattern with the highest first score |
| --- | --- | --- | --- |
| Unable Connect (3450 tickets) | Unable Connect Network (1200 tickets) Unable Connect outlook (1050 tickets) Unable connect Proxy (1100 tickets) Unable connect WiFi (100 tickets) | Unable connect proxy server (300) | |

In an embodiment, a supervised learning is provided for recognizing one or more domain keywords for more accuracy in identifying the one or more issues automatically. The processor 109 compares each of the one or more words in at least one of the first sub-sequence patterns of the n-grams or the second sub-sequence patterns of the n-grams with one or more predefined domain keywords. As an example, if the domain is "telecommunication", then some of the predefined domain keywords may be Mobile Management Entity (MME), User Equipment (UE), Serving GateWay (SGW), Packet data network GateWay (PGW), Long-Term Evolution (LTE) etc. Upon the comparison at least one of the one or more first subsequence patterns and the one or more second sub-sequence patterns comprising the one or more predefined domain keywords are obtained. Further, the at least one of the one or more first subsequence patterns and the one or more second sub-sequence patterns obtained by the processor 109 are considered as the representative first sub-sequence pattern or the representative second sub-sequence pattern for the corresponding tickets. Finally, the processor 109 identifies automatically, one or more issues in each of the one or more tickets based on the one or more first subsequence patterns and one or more second sub-sequence patterns assigned with the highest first score or the highest second score.

Figure 2:
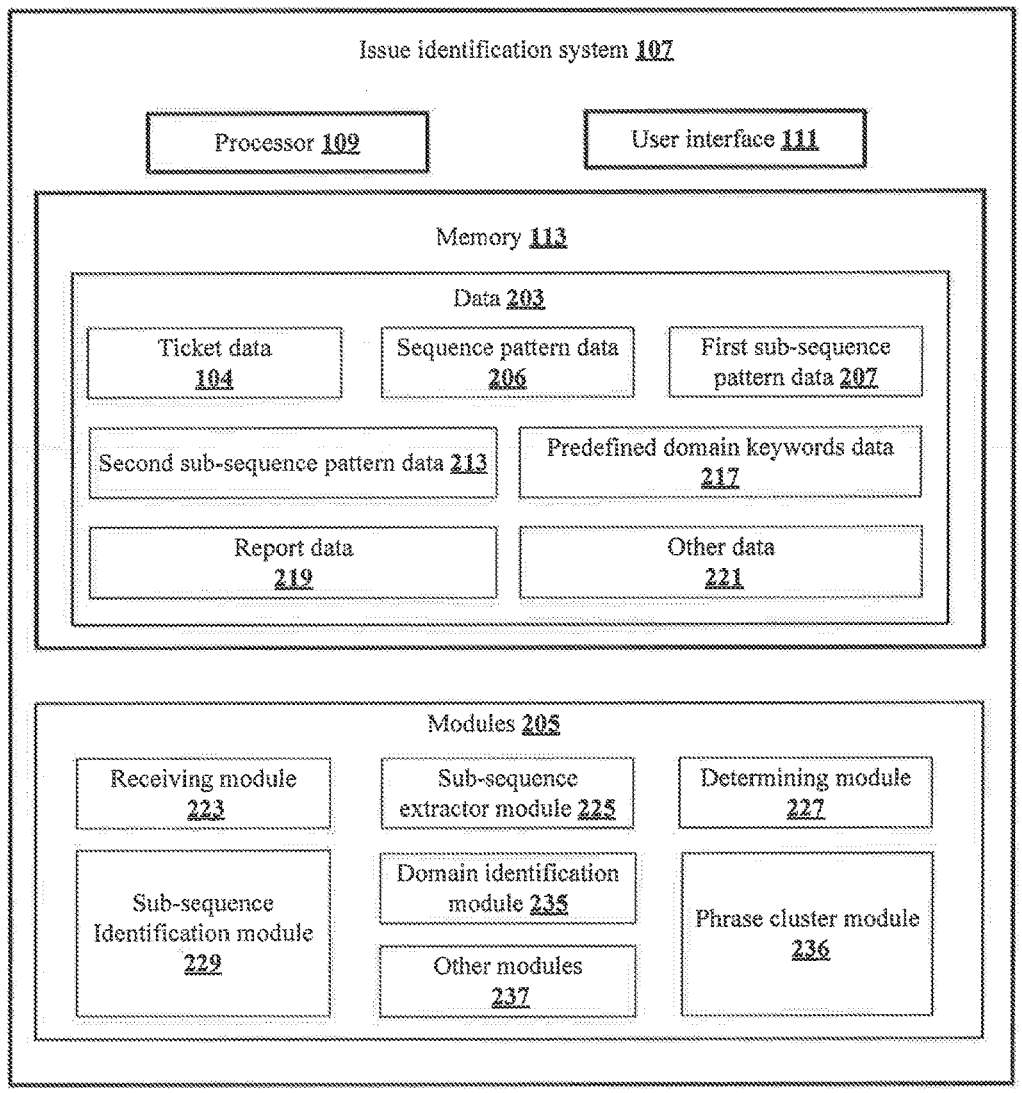
FIG. 2 shows a detailed block diagram of an issue identification system for automatically identifying one or more issues in one or more tickets of an organization in accordance with some embodiments of the present disclosure.

FIG. 2 shows a detailed block diagram of an issue identification system for automatically identifying one or more issues in one or more tickets of an organization in accordance with some embodiments of the present disclosure.

In one implementation, a user interface 111 configured in the issue identification system 107, receives ticket data 104 of one or more tickets from the one or more data sources 103. As an example, the ticket data 104 is stored in the memory 113 configured in the issue identification system 107 as shown in the FIG. 2. In one embodiment, data 203 includes ticket data 104, sequence pattern data 206, first sub-sequence pattern data 207, second sub-sequence pattern data 213, predefined domain keywords data 217 and report data 219 and other data 221. In the illustrated FIG. 2, modules 205 are described herein in detail.

In one embodiment, the data may be stored in the memory 113 in the form of various data structures. Additionally, the aforementioned data can be organized using data models, such as relational or hierarchical data models. The other data 221 may store data, including temporary data and temporary files, generated by modules 205 for performing the various functions of the issue identification system 107.

In an embodiment, the ticket data 104 may be received from the one or more data sources 103 through the communication network 105. As an example, the ticket data 104 may include, but not limited to, historical ticket data and various attributes of one or more tickets. As an example, the attributes of the one or more tickets may be a ticket Identification (ID), description of one or more issues, service category of the one or more tickets like desktop support, mainframe support etc. and other data related to the one or more tickets such as ticket category, ticket type etc. In an embodiment, the description of the one or more issues may be in a plain text format for example in plain English.

In an embodiment, the sequence pattern data 206 comprises a sequence pattern for each of the one or more tickets. The sequence pattern is formed using the description of the one or more issues of each of the one or more tickets. The sequence pattern is formed by removing one or more stop words and one or more symbols present in the description of each of the one or more issues for each of the one or more tickets. Stop words are the words which are filtered out before or after processing of natural language data. As an example, the one or more stop words may be "a", "an", "the", "to", "is", "but", "how", "or" etc. As an example, consider the description of the issue is "Down unable to connect to the outlook server". The stop words present in the description of the issue "Down unable to connect to the outlook server" are "to" and "the". Therefore, upon removing the stop words "to" and "the" from the description of the issue, the sequence pattern formed is "Down unable connect outlook server".

In an embodiment, the first sub-sequence pattern data 207 comprises the one or more first sub-sequence patterns of the n-grams for each of the one or more tickets. In an embodiment, the n-grams indicate number of words in each of the one or more sub-sequence patterns, wherein n is a variable greater than or equal to 2. As an example, if the number of words in the one or more first sub-sequence patterns is 2, then the one or more first sub-sequence patterns are referred to as 2-gram first sub-sequence patterns. In an embodiment, frequency of occurrence of each of the one or more first sub-sequence patterns of the n-grams of each of the one or more tickets belonging to the same service category is stored in the memory 113. In an embodiment, Part-Of-Speech (POS) weightage is stored in the memory 113 for each of the one or more first sub-sequence patterns of the n-grams based on one or more combinations of POS tags assigned to each of the one or more first sub-sequence patterns of the n-grams. As an example, the one or more Parts-Of-Speech may be a Noun, a verb, a pronoun, an adjective etc. In an embodiment, "CAPS" is included to the one or more Parts-Of-Speech which may be assigned to the one or more words of the one or more first sub-sequence patterns if the one or more words of the one or more first sub-sequence patterns are in uppercase. In an embodiment, a first score is stored in the memory 113 for each of the one or more first sub-sequence patterns.

In an embodiment, the second sub-sequence pattern data 213 comprises one or more second sub-sequence patterns of the n-grams for each of the one or more tickets. A distance value associated with each of the one or more second sub-sequence patterns is stored in the memory 113. In an embodiment, a frequency of occurrence of each of the one or more second sub-sequence patterns of the n-grams of the one or more tickets belonging to the same service category is stored in the memory 113. In an embodiment, Part-Of-Speech (POS) weightage assigned to each of the one or more second sub-sequence patterns of the n-grams based on one or more combinations of POS tags assigned to each of the one or more second sub-sequence patterns of the n-grams is stored in the memory 113. As an example, the one or more Parts-Of-Speech may be a Noun, a verb, a pronoun, an adjective etc. In an embodiment, "CAPS" is included to the one or more Parts-Of-Speech which may be assigned to the one or more words of the one or more first sub-sequence patterns if the one or more words of the one or more second sub-sequence patterns are in uppercase. In an embodiment, a second score is stored in the memory 113 for each of the one or more second sub-sequence patterns.

In an embodiment, predefined domain keywords data 217 comprises one or more predefined domain keywords. As an example, if the domain is "telecommunication", then some of the predefined domain keywords may be Mobile Management Entity (MME), User Equipment (UE), Serving GateWay (SGW), Packet data network GateWay (PGW), Long-Term Evolution (LTE) etc.

In an embodiment, the report data 219 comprises an issue report indicating the one or more issues identified automatically by the issue identification system 107. The issue report may be dynamically updated by merging the one or more issues identified using the one or more first sub-sequence patterns with the highest first score and the one or more second sub-sequence patterns with highest second score.

In an embodiment, the data stored in the memory 113 is processed by the modules 205 of the issue identification system 107. The modules 205 may be stored within the memory 113. In an example, the modules 205, communicatively coupled to a processor 109 configured in the issue identification system 107, may also be present outside the memory 113 as shown in FIG. 2 and implemented as hardware. As used herein, the term module refers to an application specific integrated circuit (ASIC), an electronic circuit, a processor 109 (shared, dedicated, or group) and memory 113 that execute one or more software or firmware programs, a combinational logic circuit, and/or other suitable components that provide the described functionality.

In an embodiment, the modules 205 may include, for example, a receiving module 223, a sub-sequence extractor module 225, a determining module 227, a sub-sequence identification module 229, a domain identification module 235, a phrase cluster module 236 and other modules 237. The other modules 237 may be used to perform various miscellaneous functionalities of the issue identification system 107. It will be appreciated that such aforementioned modules 205 may be represented as a single module or a combination of different modules.

In an embodiment, the receiving module 223 receives the ticket data 104 of the one or more tickets of the organization from the one or more data sources 103 through a communication network 105. As an example, the one or more data sources 103 may be one or more ticketing systems. One or more ticketing systems refer to one or more tools that are used to manage lifecycle of a support ticket. The one or more ticketing systems may be a commercial product or a custom developed solution for the organization. As an example, the organization may be any entity like a software company, a bank, an insurance company etc. that provides support to one or more users using the one or more ticketing systems.

In an embodiment, the sub-sequence extractor module 225 generates the one or more first sub-sequence patterns of the n-grams from each of the one or more sequence patterns. The one or more first sub-sequence patterns are generated by retaining the order of words in the sequence pattern for each of the one or more tickets. As an example, if the sequence pattern is "User unable connect network", the 2-gram first sub-sequence patterns of the sequence may be "User unable", "unable connect" and "connect network". In an embodiment, sub-sequence patterns like "User connect", "user network", "unable network", "network connect" etc. are invalid first sub-sequence patterns as they are formed by either skipping one or more words in the sequence pattern or they do not maintain the order of words in the sequence pattern. Similarly the one or more first sub-sequence patterns can be generated till the n-grams.

In an embodiment, the sub-sequence extractor module 225 also generates the one or more second sub-sequence patterns of the n-grams from the sequence pattern by removing one or more words from the sequence pattern in the order of their occurrence. The sequence pattern required for generating the one or more second sub-sequence patterns is identified by the identifying module 229. The one or more words removed from the sequence pattern to form each of the one or more second sub-sequence patterns of the n-grams is the distance value associated with each of the one or more second sub-sequence patterns. As an example, consider the sequence pattern "user unable email connect outlook". One word is removed in the sequence pattern to generate the second sub-sequence pattern "user email". Therefore, the distance value associated with the second sub-sequence pattern "user email" is 1.

In an embodiment, the determining module 227 determines the frequency of occurrence of each of the one or more first sub-sequence patterns of the n-grams of each of the one or more tickets belonging to the same service category. Each of the one or more first sub-sequence patterns of the n-grams of each of the one or more tickets is compared with each of the rest of the one or more first sub-sequence patterns of the corresponding n-grams of rest of the one or more tickets belonging to the same service category. The number of times each of the one or more first sub-sequence patterns repeat upon the comparison is the frequency of occurrence of the each of the one or more first sub-sequence patterns of the n-grams. Similarly, the determining module 227 determines the frequency of occurrence of the one or more second sub-sequence patterns of the n-grams of the one or more tickets belonging to the same service category.

Further the determining module 227 determines the Part-Of-Speech (POS) weightage for each of the one or more first sub-sequence patterns of the n-grams. Each of the one or more words in each of the one or more first sub-sequence patterns of n-grams are assigned with a POS tag comprising the POS. Each of the one or more first sub-sequence patterns is associated with a combination of the POS tags. As an example, the one or more combinations of the POS tags for the one or more first sub-sequence patterns of 2-grams may include, but not limited to, a Noun/Noun (NN/NN), Noun/CAPS (NN/CAPS) or CAPS/Noun (CAPS/NN), Noun/Verb (NN/VB) or Verb/Noun (VB/NN), Noun/Adjective (NN/JJ) or Adjective/Noun (JJ/NN) and other POS tag combinations. Similarly the POS tags are assigned up to the n-grams. Each of the one or more combinations of the POS tags is associated with a predefined POS weightage. The POS weightage is assigned based on a predefined priority associated with each of the one or more combinations of the POS tags. The predefined POS weightage may be dynamically configured. The predefined POS weightage of the combination of the POS tags assigned to each of the one or more first sub-sequence patterns is the determined POS weightage of each of the one or more first sub-sequence patterns. Similarly, the POS weightage is determined for each of the one or more second sub-sequence patterns. In an embodiment, the predefined POS weightage associated with the combination of the POS tags assigned to each of the one or more second sub-sequence patterns is based on the distance value associated with each of the one or more second sub-sequence patterns.

Further, the determining module 227 determines a first score associated with each of the one or more first sub-sequence patterns of the n-grams based on the frequency of occurrence and the POS weightage determined for each of the one or more first sub-sequence patterns. In an embodiment, the first score is calculated for each of the one or more first sub-sequence patterns using the Equation 1. The first sub-sequence pattern with the highest first score in each of the one or more tickets of each n-gram is considered as a representative first sub-sequence pattern for the corresponding ticket. Similarly, a second score associated with each of the one or more second sub-sequence patterns of the n-grams is determined based on the frequency of occurrence and the POS weightage determined for each of the one or more second sub-sequence patterns using the Equation 2.

In an embodiment, the sub-sequence identification module 229 identifies the one or more first sub-sequence patterns of the n-grams with the first score less than a predefined value. Further, the sequence pattern associated with each of the one or more identified first sub-sequence patterns is identified. The sequence pattern is used to determine whether the one or more identified first sub-sequence patterns belong to one of the first sub-sequence pattern with the highest first score. The one or more second sub-sequence patterns of the n-grams are generated from each of the identified sequence patterns. Further the sub-sequence identification module 229 identifies the one or more issues automatically in the one or more tickets based on the first sub-sequence pattern with the highest first score. Similarly, the sub-sequence identification module 229 identifies the one or more issues automatically in the one or more tickets based on the second sub-sequence pattern with the highest second score. Upon automatically identifying the one or more issues in the one or more tickets, the issue report is generated and updated.

In an embodiment, the domain identification module 235 recognizes the one or more domain keywords for more accuracy in identifying the one or more issues automatically. The domain identification module 235 compares each of the one or more words in at least one of the one or more first sub-sequence patterns of the n-grams or the one or more second sub-sequence patterns of the n-grams with one or more predefined domain keywords. Upon comparing the one or more words, at least one of the one or more first subsequence patterns and the one or more second sub-sequence patterns comprising the one or more predefined domain keywords are obtained. Further, the at least one of the one or more first subsequence patterns and the one or more second sub-sequence patterns obtained by the processor 109 are considered as the representative first sub-sequence pattern or the representative second sub-sequence pattern for the corresponding tickets. Finally, the processor 109 identifies automatically, one or more issues in each of the one or more tickets based on the one or more first subsequence patterns and one or more second sub-sequence patterns assigned with the highest first score or the highest second score.

In an embodiment, the phrase cluster module 236 clusters the one or more sub-sequence patterns comprising the one or more same issues by identifying typographical errors. If there is any spelling mistake found in the one or more first sub-sequence patterns, the processor 109 considers them as separate first sub-sequence patterns. As an example, consider the 2-gram first sub-sequence pattern "unable connect" and another 2-gram first sub-sequence pattern "unable connect". Though the issue is the same, because of the spelling mistake, the processor 109 considers the two first sub-sequence patterns as different issues. Therefore, a predefined technique is used by the phrase cluster module 237 to overcome the problems related to typographical errors. As an example, the predefined technique may be a Levenshtein algorithm. The phrase cluster module 237 identifies the one or more sub-sequence patterns comprising the same issues and groups them together to form a single cluster of the one or more same issues.

Figure 3A:
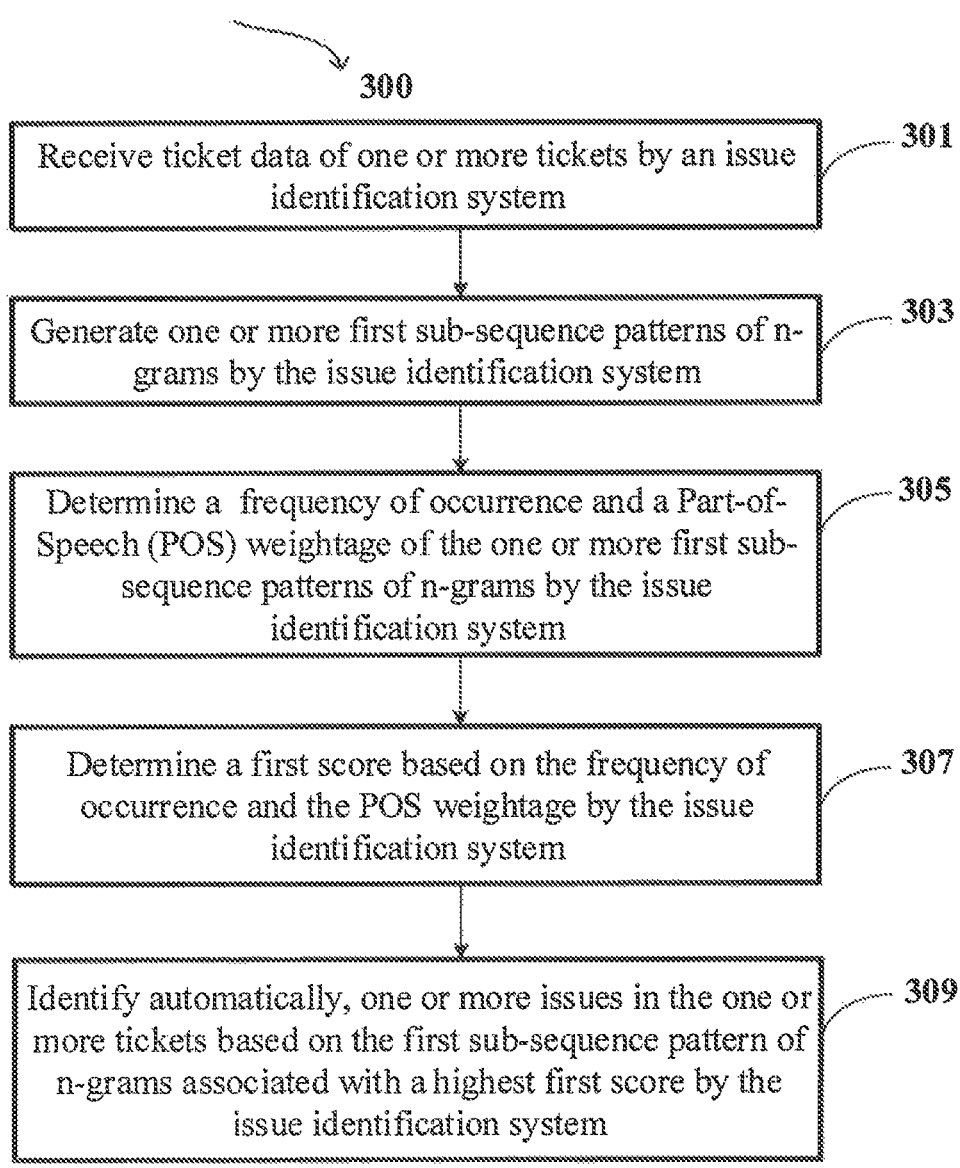
FIG. 3a shows a flowchart illustrating process of generating one or more first subsequence patterns and thereby identifying one or more issues in one or more tickets of an organization in accordance with some embodiments of the present disclosure.

FIG. 3a shows a flowchart illustrating process of generating one or more first subsequence patterns and thereby identifying one or more issues in one or more tickets of an organization in accordance with some embodiments of the present disclosure.

As illustrated in FIG. 3a, the method 300 comprises one or more blocks illustrating a method for automatically identifying one or more issues in one or more tickets of an organization by generating one or more first sub-sequence patterns. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the issue identification system 107 receives ticket data 104 of the one or more tickets of the organization from one or more data sources 103. In an embodiment, the ticket data 104 is received by a user interface 111 configured in the issue identification system 107. As an example, the one or more data sources 103 may be one or more ticketing systems. One or more ticketing systems refer to one or more tools that are used to manage lifecycle of a support ticket. The one or more ticketing systems may be a commercial product or a custom developed solution for an organization. The one or more ticketing systems allow the one or more users to log one or more tickets, track the one or more tickets and maintain all the attributes related to the one or more tickets. As an example, the ticket data 104 may include, but not limited to, historical ticket data and various attributes of the one or more tickets. As an example, the attributes of the one or more tickets may be a ticket Identification (ID), description of one or more issues, service category of the one or more tickets like desktop support, mainframe support etc. and other data related to the one or more tickets such as ticket category, ticket type etc.

At block 303, one or more first sub-sequence patterns of the n-grams are generated. In an embodiment, the processor 109 generates the one or more first sub-sequence patterns of the n-grams from each of one or more sequence patterns of each of the one or more tickets. Each of the one or more sequence patterns are formed by removing one or more stop words and one or more symbols from the description of the one or more issues. The one or more first sub-sequence patterns of the n-grams are generated by retaining the order of words in the sequence pattern for each of the one or more tickets. As an example, if the sequence pattern is "User unable connect network", the 2-gram first sub-sequence patterns of the sequence may be "User unable", "unable connect" and "connect network".

At block 305, a frequency of occurrence and a Part-Of-Speech (POS) weightage of the one or more first sub-sequence patterns of the n-grams are determined. In an embodiment, the processor 109 determines the frequency of occurrence of each of the one or more first sub-sequence patterns of the n-grams of each of the one or more tickets belonging to the same service category. Each of the one or more first sub-sequence patterns of the n-grams of each of the one or more tickets are compared with each of the rest of the one or more first sub-sequence patterns of the corresponding n-grams of rest of the one or more tickets belonging to the same service category. The number of times each of the one or more first sub-sequence patterns repeat upon the comparison is the frequency of occurrence of the each of the one or more first sub-sequence patterns of the n-grams. Further, the processor 109 determines a POS weightage for each of the one or more first sub-sequence patterns of the n-grams. Each of the one or more words in each of the one or more first sub-sequence patterns of n-grams are assigned with a POS tag indicating the POS. As an example, the one or more Parts-Of-Speech may be a Noun, a verb, a pronoun, an adjective etc. In an embodiment, "CAPS" is included to the one or more Parts-Of-Speech which may be assigned to the one or more words of the one or more first sub-sequence patterns if the one or more words of the one or more first sub-sequence patterns are in uppercase. Each of the one or more first sub-sequence patterns is associated with a combination of the POS tags. As an example, the one or more combinations of the POS tags for the one or more first sub-sequence patterns of 2-grams may include, but not limited to, a Noun/Noun (NN/NN), Noun/CAPS (NN/CAPS) or CAPS/Noun (CAPS/NN), Noun/Verb (NN/VB) or Verb/Noun (VB/NN), Noun/Adjective (NN/JJ) or Adjective/Noun (JJ/NN) and other POS tag combinations. Similarly the one or more combinations of the POS tags are assigned up to the n-grams. Each of the one or more combinations of the POS tags is associated with a predefined POS weightage. The POS weightage is assigned based on a predefined priority associated with each of the one or more combinations of the POS tags. The predefined POS weightage may be dynamically configured. The predefined POS weightage of the combination of the POS tags assigned to each of the one or more first sub-sequence patterns is the determined POS weightage of each of the one or more first sub-sequence patterns.

At block 307, a first score is determined based on the frequency of occurrence and the POS weightage. In an embodiment, the processor 109 determines the first score is for each of the one or more first sub-sequence patterns of the n-grams based on the frequency of occurrence and the POS weightage determined for each of the one or more first sub-sequence patterns using the Equation 1. Similarly, the processor 109 determines the first score for each of the one or more first sub-sequence patterns of the n-grams.

At block 309, one or more issues in the one or more tickets are identified automatically. In an embodiment, the processor 109 identifies the first sub-sequence pattern with the highest first score in each n-gram. The one or more issues are automatically identified in the one or more tickets based on the first sub-sequence pattern with the highest first score. Upon automatically identifying the one or more issues in the one or more tickets, the processor 109 generates an issue report which is displayed on the user interface 111.

Figure 3B:
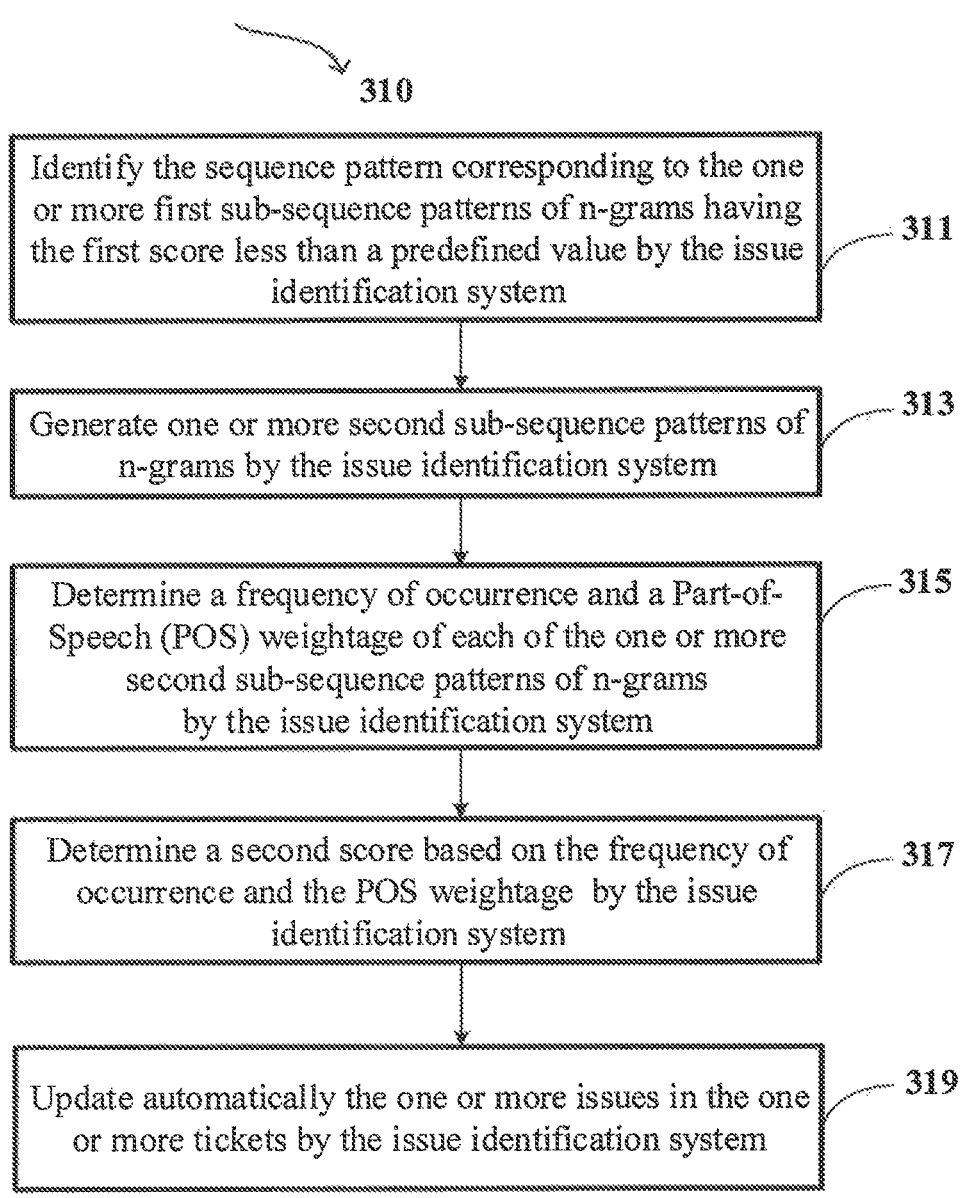
FIG. 3b shows a flowchart illustrating process of generating one or more second subsequence patterns and thereby identifying one or more issues in one or more tickets of an organization in accordance with some embodiments of the present disclosure.

FIG. 3b shows a flowchart illustrating process of generating one or more second subsequence patterns and thereby identifying one or more issues in one or more tickets of an organization in accordance with some embodiments of the present disclosure.

As illustrated in FIG. 3b, the method 310 comprises one or more blocks illustrating a method for automatically identifying one or more issues in one or more tickets of an organization by generating one or more second sub-sequence patterns. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 311, the issue identification system 107 identifies the sequence pattern corresponding to the one or more first sub-sequence patterns of the n-grams. In an embodiment, the processor 109 identifies the one or more first sub-sequence patterns of the n-grams with a first score less than a predefined value. Further, the sequence pattern associated with each of the one or more identified first sub-sequence patterns is identified by the processor 109.

At block 313, one or more second sub-sequence patterns of the n-grams are generated. In an embodiment, the processor 109 generates the one or more second sub-sequence patterns of the n-grams from sequence pattern associated with each of the one or more identified first sub-sequence patterns. In an embodiment, the one or more second sub-sequence patterns are generated by removing one or more words from the sequence pattern in the order of their occurrence. The one or more words removed from the sequence pattern to form each of the one or more second sub-sequence patterns of the n-grams is the distance value associated with each of the one or more second sub-sequence patterns.

At block 315, a frequency of occurrence and a Part-Of-Speech (POS) weightage of the one or more second sub-sequence patterns of the n-grams are determined. In an embodiment, the processor 109 determines frequency of occurrence of each of the one or more second sub-sequence patterns of the n-grams of the one or more tickets belonging to the same service category. Each of the one or more second sub-sequence patterns of the n-grams of the ticket are compared with each of the rest of the one or more second sub-sequence patterns of the corresponding n-grams of rest of the one or more tickets belonging to the same service category. The number of times each of the one or more second sub-sequence patterns repeat upon the comparison is the frequency of occurrence of the each of the one or more second sub-sequence patterns of the n-grams. Further, the processor 109 determines a POS weightage for each of the one or more second sub-sequence patterns of the n-grams.

Each of the one or more words in each of the one or more first sub-sequence patterns of n-grams are assigned with a POS tag indicating the POS. As an example, the one or more Parts-Of-Speech may be a Noun, a verb, a pronoun, an adjective etc. In an embodiment, "CAPS" is included to the one or more Parts-Of-Speech which may be assigned to the one or more words of the one or more first sub-sequence patterns if the one or more words of the one or more second sub-sequence patterns are in uppercase. Each of the one or more first sub-sequence patterns is associated with a combination of the POS tags. As an example, the one or more combinations of the POS tags for the one or more second sub-sequence patterns of 2-grams may include, but not limited to, a Noun/Noun (NN/NN), Noun/CAPS (NN/CAPS) or CAPS/Noun (CAPS/NN), Noun/Verb (NN/VB) or Verb/Noun (VB/NN), Noun/Adjective (NN/JJ) or Adjective/Noun (JJ/NN) and other POS tag combinations. Similarly the one or more combinations of the POS tags are assigned up to the n-grams. Each of the one or more combinations of the POS tags is associated with a predefined POS weightage. The POS weightage is assigned based on a predefined priority associated with each of the one or more combinations of the POS tags. The predefined POS weightage may be dynamically configured. In an embodiment, the predefined POS weightage is based on the distance value associated with each of the one or more second sub-sequence patterns of the n-grams. The predefined POS weightage is inversely proportional to the distance value i.e. greater the distance value, lesser is the predefined POS weightage associated with each of the one or more second sub-sequence patterns of the n-grams.

At block 317, a second score is determined based on the frequency of occurrence and the POS weightage. In an embodiment, the processor 109 determines a second score for each of the one or more second sub-sequence patterns of the n-grams. The second score is determined based on the frequency of occurrence and the POS weightage determined for each of the one or more second sub-sequence patterns. In an embodiment, the second score is calculated for each of the one or more second sub-sequence patterns using the Equation 2. Similarly, the processor 109 determines the second score for each of the one or more second sub-sequence patterns of the n-grams.

At block 319, the one or more issues in the one or more tickets are identified and updated automatically. In an embodiment, the processor 109 identifies the second sub-sequence pattern with the highest second score in each n-gram. The one or more issues are automatically identified in the one or more tickets based on the second sub-sequence pattern with the highest second score. The processor 109 merges the one or more second sub-sequence patterns of the n-grams with the highest second score with the one or more first sub-sequence patterns of the corresponding n-grams with the highest first score. Finally, the processor 109 generates an updated issue report and displays the issue report on the user interface 111.

Figure 4:
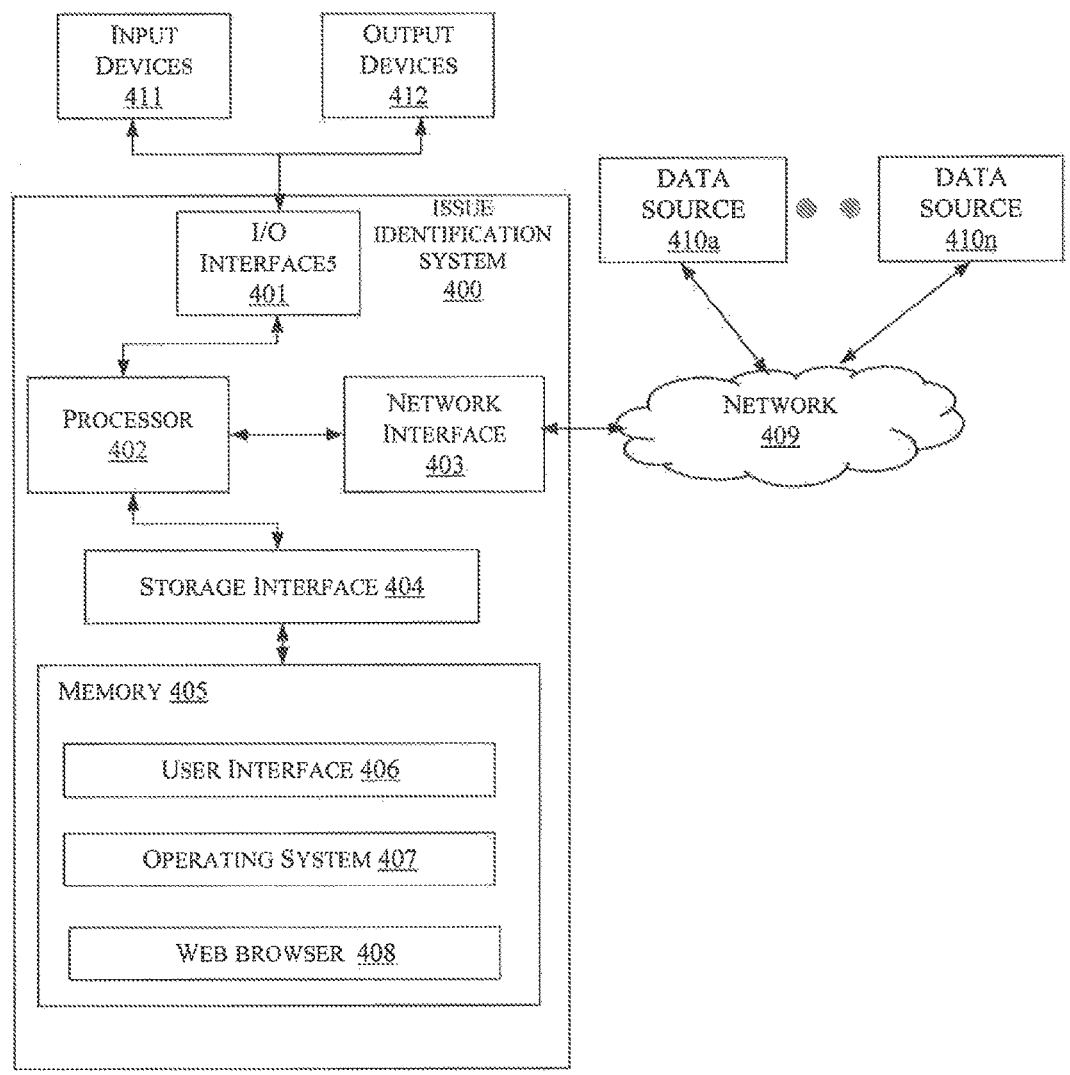
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, the issue identification system 400 is used for automatically identifying one or more issues in one or more tickets of an organization. The issue identification system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the issue identification system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect. Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the issue identification system 400 may communicate with one or more data sources 410 (a, . . . , n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more data sources 410 (a, . . . , n) may include, without limitation, personal computer(s), mobile devices such as cellular telephones, smartphones, tablet computers, eBook readers, laptop computers, notebooks, gaming consoles, or the like.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web server 408 etc. In some embodiments, issue identification system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the issue identification system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the issue identification system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the issue identification system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the issue identification system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the issue identification system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure provides a method and a system for automatically identifying one or more issues in one or more tickets of an organization.

The present disclosure provides a feature wherein the one or more issues are identified by analysing unstructured free text entered by the user and provides a structured result that helps in better understanding of the issues in the organization.

The present disclosure provides a feature wherein Part-Of-Speech tags are used to provide a POS weightage to each sequence pattern of each of the one or more tickets. Based on the POS weightage and frequency of occurrence of the one or more sub-sequence patterns, the main issue is identified for each of the one or more tickets.

The present disclosure provides an unsupervised method of identifying the one or more issues of each of the one or more tickets automatically, which in turn reduces time and efforts of senior analysts significantly.

The present disclosure also provides a supervised method to identify the presence of one or more domain keywords in the sub-sequence patterns to easily identify the issue related with that ticket.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for automatically identifying one or more issues in one or more tickets of an organization. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

REFERRAL NUMERALS

| Reference Number | Description |
| --- | --- |
| 100 | Architecture |
| 103 | One or more data sources |
| 104 | Ticket data |
| 105 | Communication network |
| 107 | Issue identification system |
| 109 | Processor |
| 111 | User interface |
| 113 | Memory |
| 203 | Data |
| 205 | Modules |
| 206 | Sequence pattern data |
| 207 | First sub-sequence pattern data |
| 213 | Second sub-sequence pattern data |
| 217 | Domain keywords data |
| 219 | Report data |
| 221 | Other data |
| 223 | Receiving module |
| 225 | Sub-sequence extractor module |
| 227 | Determining module |
| 229 | Sub-sequence identification module |
| 235 | Domain identification module |
| 236 | Phrase cluster module |
| 237 | Other modules |

What is claimed is:

1. A method for automatically identifying one or more issues in one or more tickets of an organization, the method comprising:

receiving, by an issue identification system, ticket data of one or more tickets related to a service category from one or more data sources;

generating, by the issue identification system, one or more first sub-sequence patterns of n-grams for the one or more tickets from a sequence pattern retrieved from the ticket data;

determining, by the issue identification system, a frequency of occurrence of each of the one or more first sub-sequence patterns of the n-grams and a Part-of-Speech (POS) weightage of the one or more first sub-sequence patterns of the n-grams;

determining, by the issue identification system, a first score for each of the one or more first sub-sequence patterns of the n-grams based on the frequency of occurrence and the POS weightage;

identifying, by the issue identification system, automatically, one or more issues in the one or more tickets based on the first sub-sequence pattern of the n-grams and the first score;

identifying, by the issue identification system, the sequence pattern corresponding to the one or more first sub-sequence patterns of the n-grams having the first score less than a predefined value for each of the one or more tickets;

generating, by the issue identification system, one or more second sub-sequence patterns of the n-grams by removing one or more words in the sequence pattern in order of occurrence, wherein a distance value is associated with each of the one or more second sub-sequence patterns based on the one or more words removed in the sequence pattern;

determining, by the issue identification system, a frequency of occurrence of each of the one or more second sub-sequence patterns of the n-grams and a POS weightage of the one or more second sub-sequence patterns of the n-grams;

determining, by the issue identification system, a second score for each of the one or more second sub-sequence patterns of the n-grams based on the frequency of occurrence and the POS weightage of the one or more second sub-sequence patterns of the n-grams; and updating, by the issue identification system, automatically, the one or more issues in the one or more tickets by merging the second sub-sequence pattern with the first sub-sequence pattern based on the first score and the second score.

2. The method as claimed in claim 1, wherein determining the POS weightage comprises:

assigning, by the issue identification system, a POS tag to each of one or more words in the one or more first sub-sequence patterns of the n-grams, to form a combination of the POS tags for each of the one or more first sub-sequence patterns; and assigning, by the issue identification system, a predefined weightage for the combination of the POS tags for each of the one or more first sub-sequence patterns.

3. The method as claimed in claim 2, wherein the predefined weightage is assigned based on a predefined priority associated with each of the one or more combinations of the POS tags.

4. The method as claimed in claim 1, wherein the ticket data comprises ticket Identification (ID), description of one or more issues, the service category of the one or more tickets and other data related to the one or more tickets.

5. The method as claimed in claim 1, wherein the one or more first sub-sequence patterns are generated by retaining order of words in the sequence pattern.

6. The method as claimed in claim 1, wherein determining the POS weightage comprises:

assigning, by the issue identification system, a POS tag to each of one or more words of the one or more second sub-sequence patterns of the n-grams to form a combination of the POS tags for each of the one or more second sub-sequence patterns; and assigning, by the issue identification system, a predefined weightage for the combination of the POS tags for each of the one or more second sub-sequence patterns.

7. The method as claimed in claim 6, wherein the predefined weightage is assigned based on a predefined priority associated with each of the one or more combinations of the POS tags.

8. The method as claimed in claim 1 further comprises:

comparing, by the issue identification system, each of the one or more words in at least one of the first and the second sub-sequence patterns of the n-grams with one or more predefined domain keywords;

obtaining, by the issue identification system, at least one of the one or more first subsequence patterns and the one or more second sub-sequence patterns comprising the one or more predefined domain keywords as at least one of a representative first sub-sequence pattern and representative second sub-sequence pattern; and identifying, by the issue identification system, automatically, one or more issues in each of the one or more tickets based on at least one of the representative first sub-sequence pattern and representative second sub-sequence pattern.

9. An issue identification system for automatically identifying one or more issues in one or more tickets of an organization, the issue identification system comprising:
a processor; and
a memory communicatively coupled to the processor, wherein the memory stores the processor-executable instructions, which, on execution, causes the processor to:
receive ticket data of one or more tickets related to a service category from one or more data sources;
generate one or more first sub-sequence patterns of n-grams for the one or more tickets from a sequence pattern retrieved from the ticket data;
determine frequency of occurrence of each of the one or more first sub-sequence patterns of the n-grams and a Part-of-Speech (POS) weightage of the one or more first sub-sequence patterns of the n-grams;
determine a first score for each of the one or more first sub-sequence patterns of the n-grams based on the frequency of occurrence and the POS weightage;
identify automatically, one or more issues in the one or more tickets based on the first sub-sequence pattern of the n-grams and the first score;
identify the sequence pattern corresponding to the one or more first sub-sequence patterns of the n-grams having the first score less than a predefined value for each of the one or more tickets;
generate one or more second sub-sequence patterns of the n-grams by removing one or more words in the sequence pattern in order of occurrence, wherein a distance value is associated with each of the one or more second sub-sequence patterns based on the one or more words removed in the sequence pattern;
determine a frequency of occurrence of each of the one or more second sub-sequence patterns of the n-grams and a POS weightage of the one or more second sub-sequence patterns of the n-grams;
determine a second score for each of the one or more second sub-sequence patterns of the n-grams based on the frequency of occurrence and the POS weightage of the one or more second sub-sequence patterns of the n-grams; and
update automatically, the one or more issues in the one or more tickets by merging the second sub-sequence pattern with the first sub-sequence pattern based on the first score and the second score.

10. The issue identification system as claimed in claim 9, wherein the ticket data comprises ticket Identification (ID), description of one or more issues, the service category of the one or more tickets and other data related to the one or more tickets.

11. The issue identification system as claimed in claim 9, wherein the processor is further configured to determine the POS weightage by:
assigning POS tags to each of one or more words of the one or more first sub-sequence patterns of the n-grams to form a combination of the POS tags for each of the one or more first sub-sequence patterns; and
assigning a predefined weightage for the combination of the POS tags for each of the one or more first sub-sequence patterns.

12. The issue identification system as claimed in claim 11, wherein the processor assigns the predefined weightage based on a predefined priority associated with each of the one or more combinations of the POS tags.

13. The issue identification system as claimed in claim 9, wherein the processor generates the one or more first sub-sequence patterns by retaining order of words in the sequence pattern.

14. The issue identification system as claimed in claim 9, wherein the processor is further configured to determine the POS weightage by:
assigning POS tags to each of one or more words of the one or more second sub-sequence patterns of the n-grams to form a combination of the POS tags for each of the one or more second sub-sequence patterns; and
assigning a predefined weightage for the combination of the POS tags for each of the one or more second sub-sequence patterns.

15. The issue identification system as claimed in claim 14, wherein the processor assigns the predefined weightage based on a predefined priority associated with each of the one or more combinations of the POS tags.

16. The issue identification system as claimed in claim 9, wherein the processor is further configured to:
compare each of the one or more words in at least one of the first or the second sub-sequence patterns of the n-grams with one or more predefined domain keywords;
obtain at least one of the one or more first subsequence patterns and the one or more second sub-sequence patterns comprising the one or more predefined domain keywords as a pattern with the highest score based on the comparison; and
identify automatically, one or more issues in each of the one or more tickets based on the pattern with the highest score.

17. A non-transitory computer readable medium including instructions stored thereon that when processed by at least one processor causes an issue identification system to perform operations comprising:
receiving ticket data of one or more tickets related to a service category from one or more data sources;
generating one or more first sub-sequence patterns of n-grams for the one or more tickets from a sequence pattern retrieved from the ticket data;
determining a frequency of occurrence of each of the one or more first sub-sequence patterns of the n-grams and a Part-of-Speech (POS) weightage of the one or more first sub-sequence patterns of the n-grams;
determining a first score for each of the one or more first sub-sequence patterns of the n-grams based on the frequency of occurrence and the POS weightage;
identifying automatically, one or more issues in the one or more tickets based on the first sub-sequence pattern of the n-grams and the first score;
identifying the sequence pattern corresponding to the one or more first sub-sequence patterns of the n-grams having the first score less than a predefined value for each of the one or more tickets;
generating one or more second sub-sequence patterns of the n-grams by removing one or more words in the sequence pattern in order of occurrence, wherein a distance value is associated with each of the one or more second sub-sequence patterns based on the one or more words removed in the sequence pattern;

determining a frequency of occurrence of each of the one or more second sub-sequence patterns of the n-grams and a POS weightage of the one or more second sub-sequence patterns of the n-grams;

determining a second score for each of the one or more second sub-sequence patterns of the n-grams based on the frequency of occurrence and the POS weightage of the one or more second sub-sequence patterns of the n-grams; and updating automatically, the one or more issues in the one or more tickets by merging the second sub-sequence pattern with the first sub-sequence pattern based on the first score and the second score.

* * * * *